(12) United States Patent
Liu et al.

(10) Patent No.: US 12,657,748 B2
(45) Date of Patent: Jun. 16, 2026

(54) TECHNIQUES FOR GENERATING DEPTH MAPS FROM VIDEOS

(71) Applicant: NVIDIA CORPORATION, Santa Clara, CA (US)

(72) Inventors: Chao Liu, Pittsburgh, PA (US); Benjamin Eckart, Oakland, CA (US); Jan Kautz, Lexington, MA (US)

(73) Assignee: NVIDIA CORPORATION, Santa Clara, CA (US)

( * ) Notice: Subject to any disclaimer, the term of this patent is extended or adjusted under 35 U.S.C. 154(b) by 277 days.

(21) Appl. No.: 18/508,139

(22) Filed: Nov. 13, 2023

(65) Prior Publication Data

US 2024/0303840 A1 Sep. 12, 2024

Related U.S. Application Data

(60) Provisional application No. 63/488,671, filed on Mar. 6, 2023.

(51) Int. Cl.
| | |
|---|---|
| *G06T 7/50* | (2017.01) |
| *G06T 7/20* | (2017.01) |
| *G06V 10/762* | (2022.01) |

(52) U.S. Cl.
CPC .................. *G06T 7/50* (2017.01); *G06T 7/20* (2013.01); *G06V 10/762* (2022.01)

(58) Field of Classification Search
USPC ................................... 382/154, 106; 345/419
See application file for complete search history.

(56) References Cited

U.S. PATENT DOCUMENTS

| | | | | |
|---|---|---|---|---|
| 10,984,545 | B2 * | 4/2021 | Gu | H04N 23/6812 |
| 11,037,051 | B2 * | 6/2021 | Kim | G06N 3/0455 |
| 11,164,326 | B2 * | 11/2021 | Liu | G06N 3/08 |
| 11,688,073 | B2 * | 6/2023 | Peri | G06T 7/13 |
| | | | | 345/419 |
| 12,243,251 | B1 * | 3/2025 | Kopf | G06T 7/70 |
| 2014/0035905 | A1 * | 2/2014 | Lee | H04N 13/271 |
| | | | | 345/419 |
| 2020/0090408 | A1 * | 3/2020 | Virkar | G06T 15/04 |
| 2020/0160546 | A1 * | 5/2020 | Gu | G06T 3/18 |
| 2020/0184721 | A1 * | 6/2020 | Ge | G06T 7/50 |
| 2020/0193623 | A1 * | 6/2020 | Liu | G06N 3/08 |
| 2021/0134048 | A1 * | 5/2021 | Weng | G06T 17/00 |

(Continued)

OTHER PUBLICATIONS

Xie et al. Video Depth Estimation by Fusing Flow-to-Depth Proposals, arXiv:1912.12874v2 [cs.CV] Mar. 3, 2020, pp. 1-8 (Year: 2020).*

(Continued)

*Primary Examiner* — Ishrat I Sherali
(74) *Attorney, Agent, or Firm* — Artegis Law Group, LLP

(57) ABSTRACT

The disclosed method for generating a first depth map for a first frame of a video includes performing one or more operations to generate a first intermediate depth map based on the first frame and a second frame preceding the first frame within the video, performing one or more operations to generate a second intermediate depth map based on the first frame, and performing one or more operations to combine the first intermediate depth map and the second intermediate depth map to generate the first depth map.

20 Claims, 7 Drawing Sheets

(56) References Cited

U.S. PATENT DOCUMENTS

| | | | | |
|---|---|---|---|---|
| 2023/0326028 A1* | 10/2023 | Zhang | | G06T 7/11 |
| | | | | 382/173 |
| 2023/0351624 A1* | 11/2023 | Ruhkamp | | G06T 7/529 |
| 2025/0054167 A1* | 2/2025 | McIntosh | | G06T 7/55 |
| 2025/0104259 A1* | 3/2025 | Son | | G06T 5/20 |

OTHER PUBLICATIONS

Hertz et al., "PointGMM: a Neural GMM Network for Point Clouds", IEEE, Conference on Computer Vision and Pattern Recognition, 2020, p. 12054-12063.
Wimbauer et al., "MonoRec: Semi-Supervised Dense Reconstruction in Dynamic Environments from a Single Moving Camera", IEEE Conference on Computer Vision and Pattern Recognition, 2021, pp. 6112-6122.
Yuan et al., "DeepGMR: Learning Latent Gaussian Mixture Models for Registration", 2020, pp. 1-17.
Zhang et al., "Consistent Depth of Moving Objects in Video", ACM Transactions on Graphics, https://doi.org/10.1145/3450626.3459871, vol. 40, No. 4, Article 148, Aug. 2021, pp. 148:1-148:12.
Zhou et al., "Unsupervised Learning of Depth and Ego-Motion from Video", IEEE Conference on Computer Vision and Pattern Recognition, 2017, pp. 1851-1860.
Dai et al., "ScanNet: Richly-annotated 3D Reconstructions of Indoor Scenes", arXiv:1702.04405, Apr. 11, 2017, pp. 1-22.
Davies et al., "On the Effectiveness of Weight-Encoded Neural Implicit 3d Shapes", arXiv:2009.09808, Jan. 17, 2021, pp. 1-13.
Dempster et al., "Maximum Likelihood from Incomplete Data via the EM Algorithm", Journal of the Royal Statistical Society, No. 1, 1977, pp. 1-38.
Eckart et al., "Accelerated Generative Models for 3D Point Cloud Data", IEEE Conference on Computer Vision and Pattern Recognition, 2016, pp. 5497-5505.
Eckart et al., "Self-Supervised Learning on 3D Point Clouds by Learning Discrete Generative Models", IEEE/CVF Conference on Computer Vision and Pattern Recognition, 2021, pp. 8248-8257.
Eigen et al., "Depth Map Prediction from a Single Image using a Multi-Scale Deep Network", arXiv:1406.2283, Jun. 9, 2014, pp. 1-9.
Helou et al., "NTIRE 2021 Depth Guided Image Relighting Challenge", arXiv:2104.13365, Apr. 27, 2021, 12 pages.
Fu et al., "Deep Ordinal Regression Network for Monocular Depth Estimation", arXiv:1806.02446, Jun. 6, 2018, pp. 1-10.
Geiger et al., "Are we ready for Autonomous Driving? The KITTI Vision Benchmark Suite", IEEE, 2012, 8 pages.
Genova et al., "Local Deep Implicit Functions for 3D Shape", arXiv:1912.06126, Jun. 12, 2020, 11 pages.
Genova et al., "Learning Shape Templates with Structured Implicit Functions", arXiv:1904.06447, Apr. 12, 2019, 12 pages.
Glocker et al., "Real-Time RGB-D Camera Relocalization", https://doi.org/10.1109/ISMAR.2013.6671777, 2013, 7 pages.
Godard et al., "Digging Into Self-Supervised Monocular Depth Estimation", The International Conference on Computer Vision (ICCV), 2019, pp. 3828-3838.
Goesele et al., "Multi-View Stereo Revisited", In 2006 IEEE Computer Society Conference on Computer Vision and Pattern Recognition, 2006, 8 pages.
Gordon et al., "Depth from Videos in the Wild: Unsupervised Monocular Depth Learning from Unknown Cameras", arXiv:1904.04998, Apr. 10, 2019, pp. 1-17.
Guizilini et al., "3D Packing for Self-Supervised Monocular Depth Estimation", In IEEE Conference on Computer Vision and Pattern Recognition (CVPR), 2020, pp. 2485-2494.
Hart, John C., "Sphere Tracing: A Geometric Method for the Antialiased Ray Tracing of Implicit Surfaces", The Visual Computer, vol. 12, No. 10, 1996, pp. 527-545.

Hertz et al., "PointGMM: a Neural GMM Network for Point Clouds", IEEE, Conference on Computer Vision and Pattern Recognition, 2020, pp. 12054-12063.
Ilg et al., "FlowNet 2.0: Evolution of Optical Flow Estimation with Deep Networks", IEEE Conference on Computer Vision and Pattern Recognition, 2017, pp. 2462-2470.
Jaegle et al., "Perceiver IO: A General Architecture for Structured Inputs & Outputs", Conference Paper at ICLR, arXiv:2107.14795, Mar. 15, 2022, pp. 1-29.
Jampani et al., "Superpixel Sampling Networks", ECCV, https://doi.org/10.1007/978-3-030-01234-2_22, 2018, pp. 1-17.
Ji et al., "SurfaceNet: An End-to-end 3D Neural Network for Multiview Stereopsis", IEEE International Conference on Computer Vision, 2017, pp. 2307-2315.
Knapitsch et al., "Tanks and Temples: Benchmarking Large-Scale Scene Reconstruction", ACM Transactions on Graphics, http://dx.doi.org/10.1145/3072959.3073599, vol. 36, No. 4, Article 78, Jul. 2017, pp. 78:1-78:13.
Kopf et al., "Robust Consistent Video Depth Estimation", CVPR, 2021, pp. 1611-1621.
Li et al., "Unsupervised Monocular Depth Learning in Dynamic Scenes", arXiv:2010.16404, Nov. 7, 2020, pp. 1-11.
Li et al., "Learning the Depths of Moving People by Watching Frozen People", arXiv:1904.11111, Apr. 25, 2019, 10 pages.
Li et al., "Neural Scene Flow Fields for Space-Time View Synthesis of Dynamic Scenes", IEEE/CVF Conference on Computer Vision and Pattern Recognition, 2021, pp. 6498-6508.
Liu et al., "Neural RGB D Sensing: Depth and Uncertainty from a Video Camera", IEEE/CVF Conference on Computer Vision and Pattern Recognition, 2019, pp. 10986-10995.
Liu et al., "DIST: Rendering Deep Implicit Signed Distance Function with Differentiable Sphere Tracing", IEEE/CVF Conference on Computer Vision and Pattern Recognition, 2020, pp. 2019-2028.
Lorensen, William E., "Marching Cubes: A High Resolution 3D Surface Construction Algorithm", SIGGRAP, Computer Graphics, vol. 21, No. 4, Jul. 27-31, 1987, pp. 163-169.
Luo et al., "Consistent Video Depth Estimation", ACM Transactions on Graphics, https://doi.org/10.1145/3386569.3392377, vol. 39, No. 4, Article 71, Jul. 2020, pp. 71:1-71:13.
Mescheder et al., "Occupancy Networks: Learning 3D Reconstruction in Function Space", IEEE/CVF Conference on Computer Vision and Pattern Recognition, 2019, pp. 4460-4470.
Mildenhall et al., "NeRF: Representing Scenes as Neural Radiance Fields for View Synthesis", arXiv:2003.08934, Aug. 3, 2020, pp. 1-25.
Newell et al., "Stacked Hourglass Networks for Human Pose Estimation", arXiv:1603.06937, Jul. 26, 2016, pp. 1-17.
Park et al., "DeepSDF: Learning Continuous Signed Distance Functions for Shape Representation", IEEE/CVF Conference on Computer Vision and Pattern Recognition, 2019, pp. 165-174.
Ranftl et al., "Vision Transformers for Dense Prediction", ICCV, 2021, pp. 12179-12188.
Ranftl et al., "Towards Robust Monocular Depth Estimation: Mixing Datasets for Zero-shot Cross-dataset Transfer", IEEE Transactions on Pattern Analysis and Machine Intelligence, arXiv:1907.01341, Aug. 25, 2020, pp. 1-14.
Schonberger et al., "Structure-from-Motion Revisited", Conference on Computer Vision and Pattern Recognition, 2016, pp. 4104-4113.
Shih et al., "3D Photography using Context-aware Layered Depth Inpainting", arXiv:2004.04727, Jun. 10, 2020, 15 pages.
Sinha et al., "DELTAS: Depth Estimation by Learning Triangulation and Densification of Sparse Points", arXiv:2003.08933, Aug. 25, 2020, pp. 1-23.
Srinivasan et al., "Pushing the Boundaries of View Extrapolation with Multiplane Images", IEEE/CVF Conference on Computer Vision and Pattern Recognition, 2019, pp. 175-184.
Sturm et al., "A Benchmark for the Evaluation of RGB-D Slam Systems", IEEE/RSJ International Conference on Intelligent Robot Systems, Oct. 7-12, 2012, pp. 573-580.
Takikawa et al., "Neural Geometric Level of Detail: Real-time Rendering with Implicit 3D Shapes", arXiv:2101.10994, Jan. 26, 2021, pp. 1-16.

(56) References Cited

OTHER PUBLICATIONS

Tang et al., "Ba-Net: Dense Bundle Adjustment Networks", arXiv:1806.04807, Aug. 25, 2019, 18 pages.

Teed et al., "DeepV2D: Video to Depth With Differentiable Structure From Motion", arXiv:1812.04605, Apr. 27, 2020, pp. 1-20.

Teed et al., "RAFT: Recurrent All-Pairs Field Transforms for Optical Flow", arXiv:2003.12039, Aug. 25, 2020, pp. 1-21.

Tewari et al., "Advances in Neural Rendering", arXiv:2111.05849, Nov. 10, 2021, pp. 1-29.

Tucker et al., "Single-View View Synthesis with Multiplane Images", IEEE/CVF Conference on Computer Vision and Pattern Recognition, 2020, pp. 551-560.

Wang et al., "Learning Depth from Monocular Videos using Direct Methods", IEEE Conference on Computer Vision and Pattern Recognition, 2018, pp. 2022-2030.

Wei et al., "NerfingMVS: Guided Optimization of Neural Radiance Fields for Indoor Multi-view Stereo", IEEE/CVF International Conference on Computer Vision, 2021, pp. 5610-5619.

* cited by examiner

TECHNIQUES FOR GENERATING DEPTH MAPS FROM VIDEOS

CROSS-REFERENCE TO RELATED APPLICATIONS

This application claims priority benefit of the United States Provisional patent application titled, "TECHNIQUES FOR ON-LINE CONSISTENT DEPTH ESTIMATION FROM A MONOCULAR RGB VIDEO," filed on Mar. 6, 2023, and having Ser. No. 63/488,671. The subject matter of this related application is hereby incorporated herein by reference.

BACKGROUND

Technical Field

Embodiments of the present disclosure relate generally to computer science, artificial intelligence, and computer graphics and, more specifically, to techniques for generating depth maps from videos.

Description of the Related Art

In computer graphs and computer vision, a depth map is an image that indicates the distances between the surfaces of objects within a scene and a viewpoint. Generally speaking, the depth map indicates how far the different surfaces are from the viewpoint. Depth maps are implemented in many real-world applications, including in image rendering, generating augmented reality environments, generating three-dimensional (3D) reconstructions of physical environments, and recognizing objects in images.

One conventional approach for generating depth maps for the frames of a video is to separately process each frame of the video in order to estimate the depths of the different objects within the frame to generate a corresponding depth map for that frame. One drawback of this type of approach, though, is that, oftentimes, the depth maps generated across multiple frames include small discrepancies in the depths of any objects appearing within those multiple frames, i.e., the generated depth maps are not temporally coherent. The lack of temporal coherence across depth maps corresponding to different frames can cause undesired artifacts, such as flickering in a video that is rendered using such temporally incoherent depth maps.

Another conventional approach for generating depth maps for the different frames of a video is to train a machine learning model, such a neural network, to generate the depth maps based on the frames of the video. When the machine learning model is trained using the frames of a video as training data, the trained machine learning model can oftentimes generate depth maps that are more temporally coherent than depth maps that are generated by processing each frame separately. One drawback of generating depth maps using a trained machine learning model is the training process typically is very computationally expensive and, therefore, requires significant amounts of computing resources and time. Accordingly, conventional machine learning techniques, as a practical matter, cannot be used to generate depth maps for the frames of a video in real-time, as the video is being captured.

As the foregoing illustrates, what is needed in the art are more effective techniques for generating depth maps for videos.

SUMMARY

One embodiment of the present disclosure sets forth a computer-implemented method for generating a first depth map for a first frame of a video. The method includes performing one or more operations to generate a first intermediate depth map based on the first frame and a second frame preceding the first frame within the video. The method further includes performing one or more operations to generate a second intermediate depth map based on the first frame. In addition, the method includes performing one or more operations to combine the first intermediate depth map and the second intermediate depth map to generate the first depth map.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is that the disclosed techniques can be used to generate temporally-coherent depth maps for the different frames of a video sequence. Videos generated using the temporally-coherent depth maps advantageously include fewer flickering artifacts relative to videos that are rendered using depth maps that are generated by separately processing each frame of a video sequence. In addition, with the disclosed techniques, a machine learning model does not have to be trained using the video for which depth maps are to be generated. Accordingly, the disclosed techniques are more computationally efficient than conventional approaches that require the use of such a trained machine learning model. As a result, the disclosed technique can be used to generate depth maps for the frames of a video in real-time, as the video is being captured. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

General Overview

Embodiments of the present disclosure provide techniques for generating depth maps for the frames of a video. In some embodiments, a depth estimation application processes the first frame of a video using a single-frame depth estimation technique to generate a depth map for the first frame. For each subsequent frame of the video, the depth estimation application computes an optical flow between a previous frame and the current frame, and the depth estimation application then applies a pose optimization technique to compute a relative camera pose between the previous frame and the current frame given the optical flow and a depth map associated with the previous frame. In parallel, the depth estimation application generates a point cloud for the previous frame by back-projecting pixels of the previous frame into three dimensions (3D) using the depth map associated with the previous frame and a camera intrinsic matrix, and then the depth estimation application generates a 3D Gaussian mixture model (GMM) from the point cloud using a differentiable clustering technique. Subsequently, the depth estimation application transforms the 3D GMM using the relative camera pose to generate a transformed 3D GMM. Then, the depth estimation application generates a first depth map and a corresponding uncertainty map by rendering the transformed 3D GMM using a ray tracing technique. Thereafter, the depth estimation application generates a fused depth map, which includes depth estimates for objects in the current frame, by inputting the first depth map, a second depth map estimated from the current frame using a single-frame depth estimation technique, the current frame, and the uncertainty map into a trained fusion model that outputs the fused depth map.

The techniques for generating depth maps for the frames of a video have many real-world applications. For example, those techniques could be used to render images, including graphics effects in the images. As another example, those techniques could be used to generate augmented reality environments. As a further example, those techniques could be used to generate 3D reconstructions of physical environments. As yet another example, those techniques could be used to recognize objects in images.

The above examples are not in any way intended to be limiting. As persons skilled in the art will appreciate, as a general matter, the techniques for generating depth maps described herein can be implemented in any suitable application.

System Overview

Figure 1:
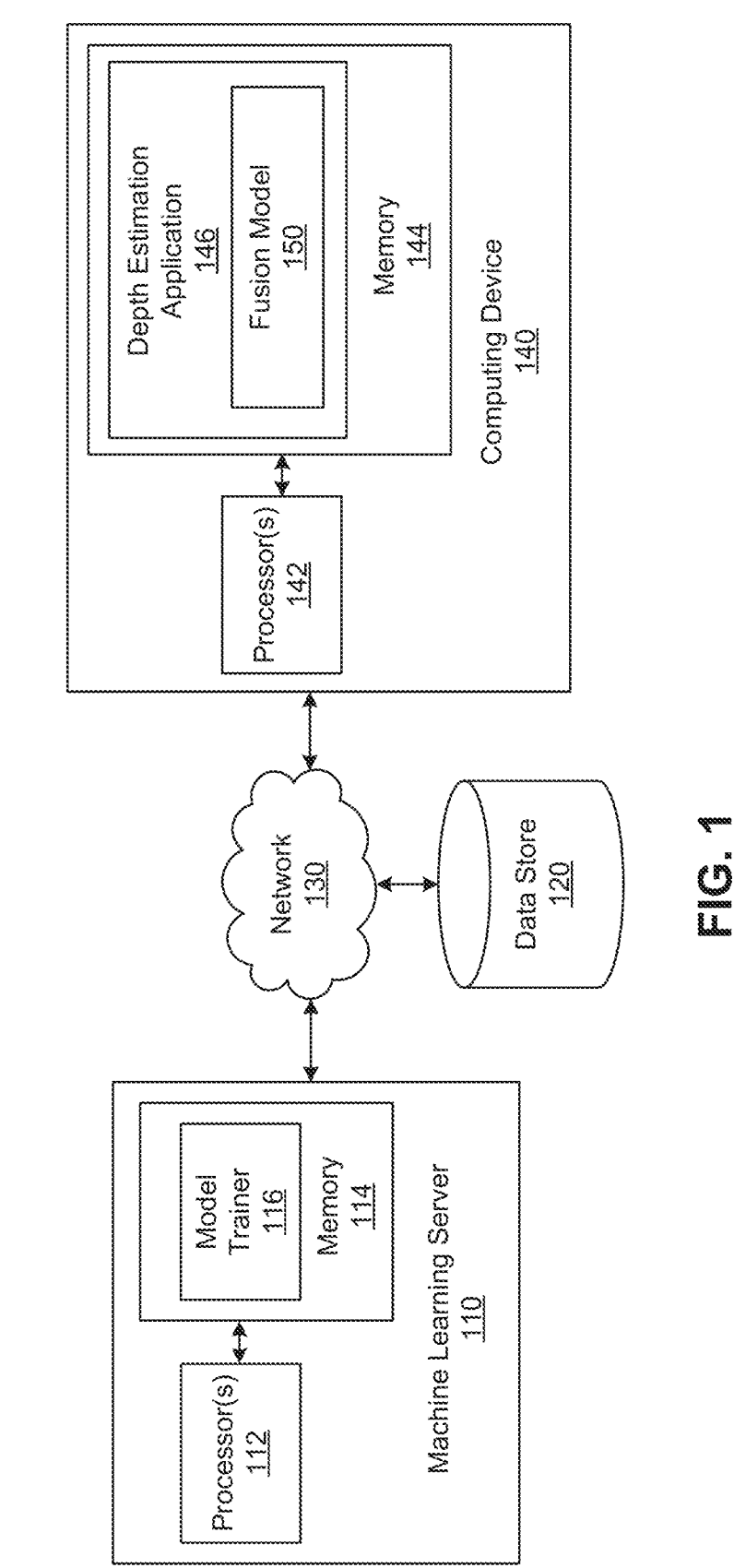
FIG. 1 illustrates a block diagram of a computer-based system configured to implement one or more aspects of the various embodiments.

FIG. 1 illustrates a block diagram of a computer-based system 100 configured to implement one or more aspects of at least one embodiment. As shown, the system 100 includes a machine learning server 110, a data store 120, and a computing device 140 in communication over a network 130, which can be a wide area network (WAN) such as the Internet, a local area network (LAN), a cellular network, and/or any other suitable network.

As shown, a model trainer 116 executes on one or more processors 112 of the machine learning server 110 and is stored in a system memory 114 of the machine learning server 110. The processor 112 receives user input from input devices, such as a keyboard or a mouse. In operation, the one or more processors 112 may include one or more primary processors of the machine learning server 110, controlling and coordinating operations of other system components. In particular, the processor(s) 112 can issue commands that control the operation of one or more graphics processing units (GPUs) (not shown) and/or other parallel processing circuitry (e.g., parallel processing units, deep learning accelerators, etc.) that incorporates circuitry optimized for graphics and video processing, including, for example, video output circuitry. The GPU(s) can deliver pixels to a display device that can be any conventional cathode ray tube, liquid crystal display, light-emitting diode display, and/or the like.

The system memory 114 of the machine learning server 110 stores content, such as software applications and data, for use by the processor(s) 112 and the GPU(s) and/or other processing units. The system memory 114 can be any type of memory capable of storing data and software applications, such as a random-access memory (RAM), a read-only memory (ROM), an erasable programmable read-only memory (EPROM or Flash ROM), or any suitable combination of the foregoing. In some embodiments, a storage (not shown) can supplement or replace the system memory 114. The storage can include any number and type of external memories that are accessible to the processor 112 and/or the GPU. For example, and without limitation, the storage can include a Secure Digital Card, an external Flash memory, a portable compact disc read-only memory (CD-ROM), an optical storage device, a magnetic storage device, and/or any suitable combination of the foregoing.

The machine learning server 110 shown herein is for illustrative purposes only, and variations and modifications are possible without departing from the scope of the present disclosure. For example, the number of processors 112, the number of GPUs and/or other processing unit types, the number of system memories 114, and/or the number of applications included in the system memory 114 can be modified as desired. Further, the connection topology between the various units in FIG. 1 can be modified as desired. In some embodiments, any combination of the processor(s) 112, the system memory 114, and/or GPU(s) can be included in and/or replaced with any type of virtual computing system, distributed computing system, and/or cloud computing environment, such as a public, private, or a hybrid cloud system.

In some embodiments, the model trainer 116 is configured to train one or more machine learning models, including a fusion model 152 that is trained to fuse different information to generate a depth map for a frame of a video. In such cases, the different information can include (1) a first depth map generated by estimating depth in the frame, (2) a second depth map generating using the frame and a previous frame, (3) an uncertainty map associated with the second depth map, and (4) the frame. In some embodiments, the model trainer 116 can train the fusion model 152 using training data that includes optical flows computed from consecutive frames of videos and optical flows computed from geometry, as discussed in greater detail below in conjunction with FIGS. 4 and 6. In some other embodiments, the fusion model 152 can be trained in any technically feasible manner by the model trainer 116. Training data and/or trained machine learning models, including the fusion model 152, can be stored in the data store 120. In some embodiments, the data store 120 can include any storage device or devices, such as fixed disc drive(s), flash drive(s), optical storage, network attached storage (NAS), and/or a storage area-network (SAN). Although shown as accessible over the network 130, in at least one embodiment the machine learning server 110 can include the data store 120.

As shown, a depth estimation application 146 that uses the fusion model 152 to generate depth maps for video frames is stored in a system memory 144, and executes on a processor 142, of the computing device 140. Once trained, the fusion model 152 can be deployed in any suitable manner, such as in the depth estimation application 146. Further, the depth estimation application 146 can generate depth maps corresponding to the frames of a video for any suitable purposes, such as for rendering images or videos, for generating augmented reality environments, for generating 3D reconstructions of a physical environment, or for recognizing objects in the video. Components of the depth estimation application 146 and functionality thereof are discussed in greater detail below in conjunction with FIGS. 3-4.

Figure 2:
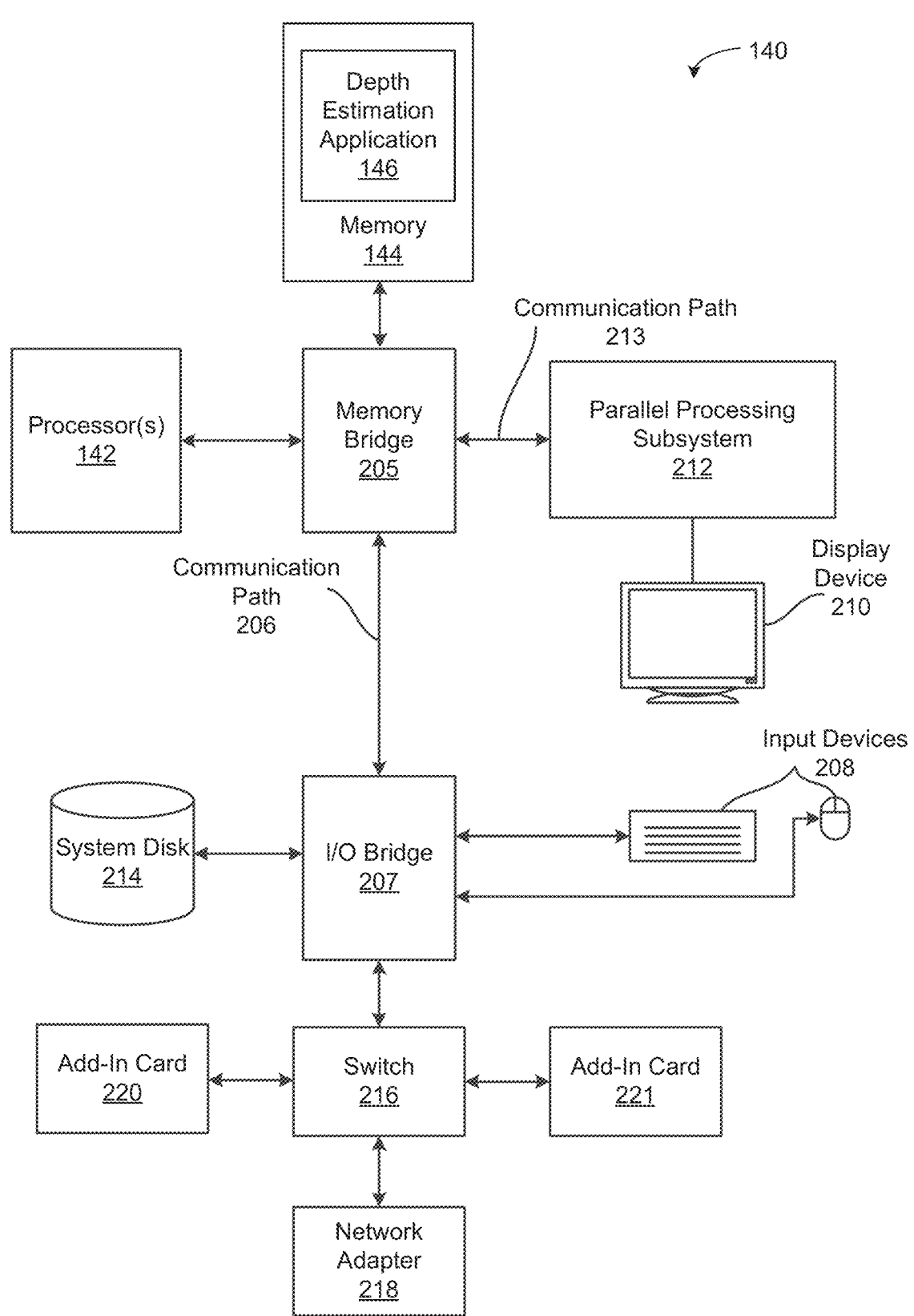
FIG. 2 is a more detailed illustration of the computing device FIG. 1, according to various embodiments.

FIG. 2 is a block diagram illustrating the computing device 140 of FIG. 1 in greater detail, according to various embodiments. The computing device 140 may include any type of computing system, including, without limitation, a server machine, a server platform, a desktop machine, a laptop machine, a hand-held/mobile device, a digital kiosk, an in-vehicle infotainment system, and/or a wearable device. In some embodiments, the computing device 140 is a server machine operating in a data center or a cloud computing environment that provides scalable computing resources as a service over a network. In some embodiments, the machine learning server 110 can include one or more similar components as the computing device 140.

In various embodiments, the computing device 140 includes, without limitation, the processor(s) 142 and the memory(ies) 144 coupled to a parallel processing subsystem 212 via a memory bridge 205 and a communication path 213. Memory bridge 205 is further coupled to an I/O (input/output) bridge 207 via a communication path 206, and I/O bridge 207 is, in turn, coupled to a switch 216.

In one embodiment, I/O bridge 207 is configured to receive user input information from optional input devices 208, such as a keyboard, mouse, touch screen, sensor data analysis (e.g., evaluating gestures, speech, or other information about one or more uses in a field of view or sensory field of one or more sensors), and/or the like, and forward the input information to the processor(s) 142 for processing. In some embodiments, the computing device 140 may be a server machine in a cloud computing environment. In such embodiments, computing device 140 may not include input devices 208, but may receive equivalent input information by receiving commands (e.g., responsive to one or more inputs from a remote computing device) in the form of messages transmitted over a network and received via the network adapter 218. In some embodiments, switch 216 is configured to provide connections between I/O bridge 207 and other components of the computing device 140, such as a network adapter 218 and various add-in cards 220 and 221.

In some embodiments, I/O bridge 207 is coupled to a system disk 214 that may be configured to store content and applications and data for use by processor(s) 142 and parallel processing subsystem 212. In one embodiment, system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid state storage devices. In various embodiments, other components, such as universal serial bus or other port connections, compact disc drives, digital versatile disc drives, film recording devices, and the like, may be connected to I/O bridge 207 as well.

In various embodiments, memory bridge 205 may be a Northbridge chip, and I/O bridge 207 may be a Southbridge chip. In addition, communication paths 206 and 213, as well as other communication paths within computing device 140, may be implemented using any technically suitable protocols, including, without limitation, AGP (Accelerated Graphics Port), HyperTransport, or any other bus or point-to-point communication protocol known in the art.

In some embodiments, parallel processing subsystem 212 comprises a graphics subsystem that delivers pixels to an optional display device 210 that may be any conventional cathode ray tube, liquid crystal display, light-emitting diode display, and/or the like. In such embodiments, the parallel processing subsystem 212 may incorporate circuitry optimized for graphics and video processing, including, for example, video output circuitry. Such circuitry may be incorporated across one or more parallel processing units (PPUs), also referred to herein as parallel processors, included within the parallel processing subsystem 212.

In some embodiments, the parallel processing subsystem 212 incorporates circuitry optimized (e.g., that undergoes optimization) for general purpose and/or compute processing. Again, such circuitry may be incorporated across one or more PPUs included within parallel processing subsystem 212 that are configured to perform such general purpose and/or compute operations. In yet other embodiments, the one or more PPUs included within parallel processing subsystem 212 may be configured to perform graphics processing, general purpose processing, and/or compute processing operations. System memory 144 includes at least one device driver configured to manage the processing operations of the one or more PPUs within parallel processing subsystem 212. In addition, the system memory 144 includes the depth estimation application 146. Although described herein primarily with respect to the depth estimation application 146, techniques disclosed herein can also be implemented, either entirely or in part, in other software and/or hardware, such as in the parallel processing subsystem 212.

In various embodiments, parallel processing subsystem 212 may be integrated with one or more of the other elements of FIG. 2 to form a single system. For example, parallel processing subsystem 212 may be integrated with processor 142 and other connection circuitry on a single chip to form a system on a chip (SoC).

In some embodiments, processor(s) 142 includes the primary processor of computing device 140, controlling and coordinating operations of other system components. In some embodiments, the processor(s) 142 issues commands that control the operation of PPUs. In some embodiments, communication path 213 is a PCI Express link, in which dedicated lanes are allocated to each PPU. Other communication paths may also be used. The PPU advantageously implements a highly parallel processing architecture, and the PPU may be provided with any amount of local parallel processing memory (PP memory).

It will be appreciated that the system shown herein is illustrative and that variations and modifications are possible. The connection topology, including the number and arrangement of bridges, the number of CPUs 202, and the number of parallel processing subsystems 212, may be modified as desired. For example, in some embodiments, system memory 144 could be connected to the processor(s) 142 directly rather than through memory bridge 205, and other devices may communicate with system memory 144 via memory bridge 205 and processor 142. In other embodiments, parallel processing subsystem 212 may be connected to I/O bridge 207 or directly to processor 142, rather than to memory bridge 205. In still other embodiments, I/O bridge 207 and memory bridge 205 may be integrated into a single chip instead of existing as one or more discrete devices. In certain embodiments, one or more components shown in FIG. 2 may not be present. For example, switch 216 could be eliminated, and network adapter 218 and add-in cards 220, 221 would connect directly to I/O bridge 207. Lastly, in certain embodiments, one or more components shown in FIG. 2 may be implemented as virtualized resources in a virtual computing environment, such as a cloud computing environment. In particular, the parallel processing subsystem 212 may be implemented as a virtualized parallel processing subsystem in at least one embodiment. For example, the parallel processing subsystem 212 may be implemented as a virtual graphics processing unit(s) (vGPU(s)) that renders graphics on a virtual machine(s) (VM(s)) executing on a server machine(s) whose GPU(s) and other physical resources are shared across one or more VMs.

Generating Depth Maps from Videos

Figure 3:
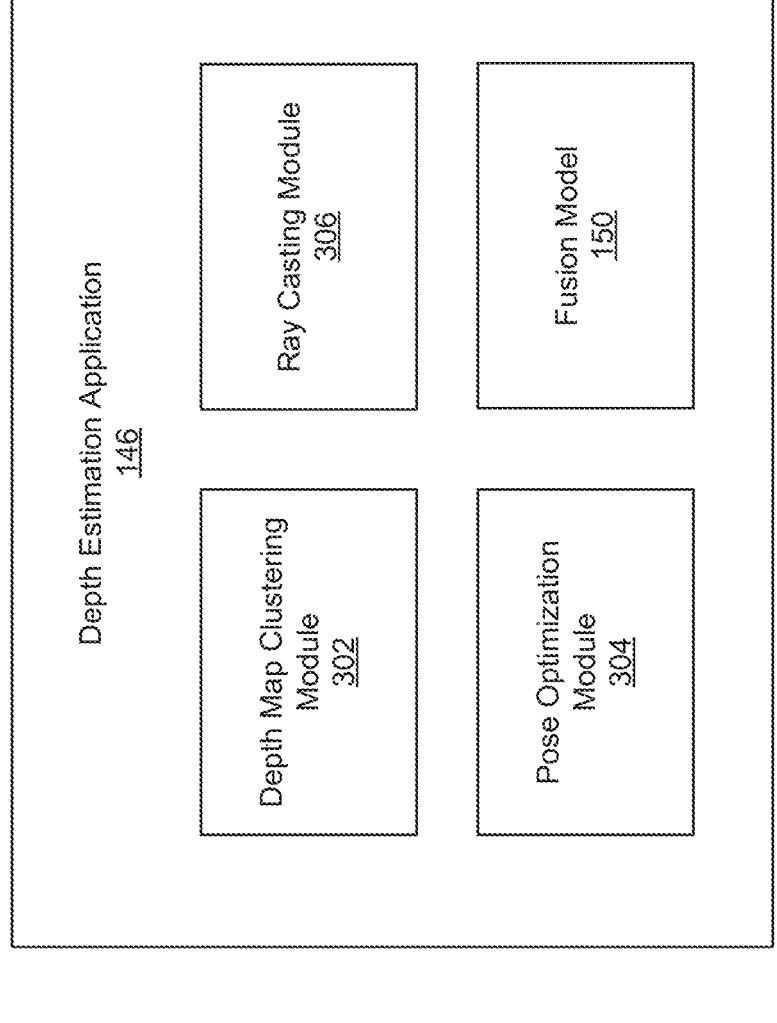
FIG. 3 is a more detailed illustration of the depth estimation application of FIG. 1, according to various embodiments.

FIG. 3 is a more detailed illustration of the depth estimation application 146 of FIG. 1, according to various embodiments. As shown, the depth estimation application 146 includes a depth map clustering module 302, a pose optimization module 304, a ray casting module 306, and the fusion model 150. With the depth map clustering module 302, the pose optimization module 304, the ray casting module 306, and the fusion model 150, the depth estimation application 146 can generate depth maps corresponding to the frames of a video for any suitable purpose, such as for rendering images or videos, for generating augmented reality environments, for generating 3D reconstructions of a physical environment, or for recognizing objects in the video. In some embodiments, the fusion model 150 is an artificial neural network, and each of the modules 302, 304, and 306 performs analytical operations that are differentiable such that the fusion model 150 can be trained by backpropagating through each layer, including the modules 302, 304, and 306.

The depth map clustering module 302 is configured to convert a dense depth map to a 3D Gaussian mixture model (GMM) using a differentiable clustering technique. The 3D GMM is a continuous geometric representation for the field of view (FOV) associated with a video frame. In some embodiments, the depth map clustering module 302 performs an expectation-maximization (EM)-like technique, discussed in greater detail below in conjunction with FIG. 4, to generate a 3D GMM from a dense depth map.

The pose optimization module 304 is configured to geometrically align consecutive frames of a video. In some embodiments, the pose optimization module 304 performs a differentiable optimization technique in which iterative gradients are computed at each of a number of time steps of the optimization to compute a relative camera pose between consecutive frames. In such cases, the pose optimization module 304 can take as inputs an optical flow between the consecutive frames and a depth map associated with a first frame in the consecutive frames, and the pose optimization module 304 can output the relative camera pose between the consecutive frames. The optical flow between consecutive frames indicates the dense correspondence between those frames, i.e., the correspondence between pixels of the consecutive frames. For example, in some embodiments, the optical flow includes, for each pixel, a vector indicating how the pixel changed between the consecutive frames.

The ray casting module 306 is configured to convert a transformed 3D GMM to a depth map. In some embodiments, the transformed 3D GMM is a 3D GMM for a frame that is output by the depth clustering module 302 and transformed according to a relative pose between the frame and a previous frame that is output by the pose optimization module 304. The transformation essentially rotates and shifts the world including the 3D GMM while keeping the camera fixed. In some embodiments, the ray casting module 306 performs a ray casting technique to render the transformed 3D GMM as a depth map. In some other embodiments, the ray casting module 306 can perform any technically feasible rendering technique, such as any suitable ray tracing technique, to generate a depth map from a transformed 3D GMM.

The fusion model 150 is a machine learning model that is trained to combine depth maps generated by (1) the ray casting module 306, and (2) using a single-frame depth estimation technique. In some embodiments, the fusion model 150 is a neural network that includes an hourglass architecture and takes as inputs (1) the depth map generate for a frame using the single-frame depth estimation technique, (2) the depth map generated for the frame by the ray casting module 306, (3) an uncertainty map corresponding to the depth map generated by the ray casting module 306, and (4) the frame itself. Given such inputs, the fusion model 150 outputs a fused depth map for the frame. In some embodiments, the fusion model 150 is trained using training data that includes optical flows computed from consecutive frames of videos and optical flows computed from geometry, as discussed in greater detail below in conjunction with FIGS. 4 and 6. Among other things, the fusion model 150 can learn through training to trust depths in the depth map generated for the frame by the ray casting module 306 that are associated with lower uncertainty in the corresponding uncertainty map and vice versa, and the fusion model 150 can also learn to be guided by the frame itself, such as the edges within the frame, when generating the fused depth map.

In some embodiments, the depth estimation application 146 processes the first frame of a video using a single-frame depth estimation technique to generate a depth map for the first frame. Any technically feasible single-frame depth estimation technique, including known techniques, can be used in some embodiments. For example, in some embodiments, the single-frame depth estimation technique can process the first frame using a depth estimation neural network to generate the depth map for the first frame. As another example, in some embodiments, the single-frame depth estimation technique can use depth data that is acquired via one or more depth sensors to generate the depth map for the first frame. For each frame of the video after the first frame, the depth estimation application 306 computes an optical flow between a previous frame and the current frame. Any technically feasible technique, including known techniques such as processing the frame using a dense optical flow neural network, can be employed to compute the optical flow in some embodiments. The pose optimization module 304 of the depth estimation application 146 then applies the differentiable pose optimization technique, described above, to compute a relative camera pose between the previous frame and the current frame given the optical flow and a depth map associated with the previous frame. In parallel, the depth map clustering module 302 of the depth estimation application 146 generates a point cloud for the previous frame by back-projecting pixels of the previous frame into 3D using the depth map associated with the previous frame and a camera intrinsic matrix. Then, the depth map clustering module 302 generates a 3D GMM from the point cloud using the differentiable clustering technique, described above. Subsequently, the depth estimation application 146 transforms the 3D GMM using the relative camera pose to generate a transformed 3D GMM. Then, the ray casting module 306 of the depth estimation application 146 generates a first depth map and a corresponding uncertainty map by rendering the transformed 3D GMM using a ray casting technique. Thereafter, the depth estimation application 146 generates a fused depth map by inputting the first depth map, a second depth map estimated from the current frame using a single-frame depth estimation technique, the corresponding uncertainty map, and the current frame itself, into the fusion model 150. Given such inputs, the fusion model 150 outputs the fused depth map, which is an estimated depth map for the current frame. Notably, because geometric consistency is enforce across frames using the depth map clustering module 302, the pose optimization module 304, the ray casting module 306, and the fusion model 150, the depth estimation application 146 can generate temporally-coherent depth maps for the different frames of a video.

Figure 4:
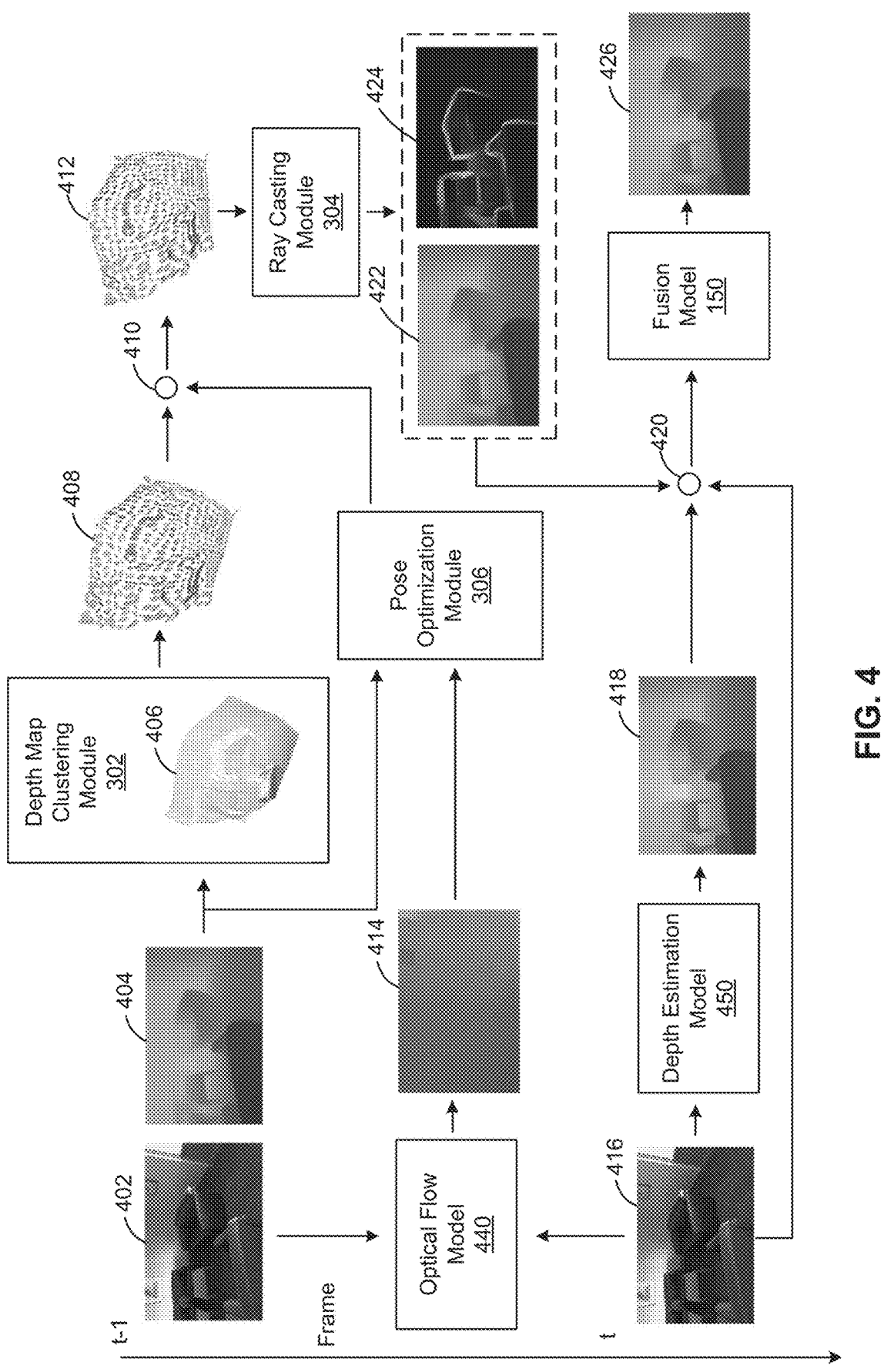
FIG. 4 illustrates how a depth map is generated for one frame of a video, according to various embodiments.

FIG. 4 illustrates how a depth map is generated for one frame of a video, according to various embodiments. As shown, given consecutive frames 402 and 416 at times t−1 and t, respectively, as well as a depth map 404 associated with the frame 402 at time t−1, the depth estimation application 146 generates a depth map 426 associated with the frame at time t. The depth map 404 associated with the frame 402 at time t−1 can be generated using the same technique, or using a single-frame depth estimation technique if the frame 402 at time t−1 is the first frame of the video. As described, in some embodiments, the single-frame depth estimation technique can include processing the first frame using a depth estimation neural network to generate a depth map for the first frame or using depth data that is acquired via one or more depth sensors to generate the depth map for the first frame.

Illustratively, the depth map clustering module 302 generates a point cloud 406 for the frame 402 by back-projecting pixels of the frame 402 into 3D using the depth map 404 associated with the frame 402 and a camera intrinsic matrix. Then, the depth map clustering module 302 converts the point cloud 406 into a 3D GMM 408 by performing an EM-like technique. The 3D GMM 408 is a 3D geometry that includes a number of blobs having a sparse correspondence with points in the point cloud 406. In the sparse correspondence, each blob of the 3D GMM 408 can correspond to a relatively small region of the frame 402 that is a projection of the blob onto the frame 402, as opposed to corresponding to the entire frame 402. In some embodiments, affinities are not computed for pixels of the frame 402 that are far away from a given blob, such that an affinity matrix between pixels of the frame 402 and blobs is sparse, i.e., the affinity matrix has 0 values for entries associated with pixels and blobs that are far away from each other. Among other things, the sparsity of the affinity matrix permits smaller computational and memory loads when the fusion model 150 to being trained. In some embodiments, the EM-like technique that the depth map clustering module 302 performs to generate the 3D GMM 408 can include (1) an E step in which the depth map clustering module 302 calculates affinities between each blob of the 3D GMM and pixels in the frame, and (2) an M step in which the depth map clustering module 302 updates the shape and location of the blob based on the calculated affinities. In such cases, the E and M steps can be formulated analytically, and the 3D GMM 408 can be optimized over a number of time steps during which gradients calculated. It should be noted that such a formulation is differentiable, which enables the backwards operation to be performed during training of the fusion model 150. More formally, given a dense depth map $$\mathcal{D}^t = \{d_i^t\}$$

from frame t of a video as a set of N pixels indexed by i, the corresponding point cloud can be estimated by back-projecting the pixels into 3D space:

$$\mathcal{P}^t = \pi^{-1}(\mathcal{D}^t; K), \tag{1}$$

where $\pi^{-1}$ is the back projection operation that maps points on the image plan to the 3D world given the dense depth map $\mathcal{D}^t$ and camera intrinsic matrix K.

The 3D GMM is a set of parametric clusters from point cloud $P^t$. More specifically, for the j-th cluster out of J components, the locations, shapes, and orientations of the clusters are modeled by 3D Gaussians in space:

$$\Theta_j^t = (w_j^t, \mu_j^t, \Sigma_j^t), \tag{2}$$

where the mean $$\mu_j^t$$

encodes the 3D location; the covariance $$\Sigma_j^t$$

encodes the shape, size and orientation; the weight $$w_j^t$$

encodes the contribution of the Gaussian since each point is modeled by multiple 3D GMMs.

An affinity matrix $$\Gamma^t_{ij}$$

is defined by all N×J posterior probabilities, each entry describing the contribution of the i-th point $$p^t_i$$

to the j-th cluster:

$$\Gamma^t_{ij} \overset{def}{=} p(p^t_i \mid \Theta^t_j) = \frac{w^t_j S(p^t_i; \mu^t_j, \Sigma^t_j)}{\Sigma_k w^t_k S(p^t_i; \mu^t_k, \Sigma^t_k)}, \quad (3)$$

with $$S(p; \mu, \Sigma) = \exp\left(-\frac{1}{2}(p-\mu)^T \Sigma^{-1}(p-\mu)\right).$$

The goal is to estimate a geometrically consistent depth stream $\{\mathcal{D}^t\}$ from an RGB (red, green, blue) input video by maintaining $\Gamma^t$ and $$\Theta^t_j$$

for j=1, . . . , J over each frame. To this end, a dense depth map needs to be converted into 3D GMMs through depth map clustering, and the dense depth map needs to be recovered from the 3D GMM given a new viewing camera pose and set of 3D rays. In some embodiments, a parametric clustering technique can be performed as follows. Given the point cloud or dense input features, the GMM parameters $\Theta$ can be estimated by maximizing the likelihood of the points via the EM-like process. Rather than assuming isotropic Gaussians, fully anisotropic Gaussians can be modeled to consider the shape and orientation of the local structure.

More specifically, in some embodiments, the parametric clustering process includes iterations of E-step and M-step. In the E-step, given the current estimation of the clusters $\{\Theta_j\}$ defined in equation (2) and the point cloud $\mathcal{P}$, the entries of the affinity matrix $\Gamma$ can be updated using equation (3). For notation simplicity, the frame index t is used unless otherwise required.

During the M-step, to update the parameter $\Theta_j$ for the clusters, the zeroth, first and second moments of the points can first be defined as:

$$M^j_0 = \sum_i \Gamma_{ij}, \ M^j_1 = \sum_i \Gamma_{ij} p_i, \ M^j_2 = \sum_i \Gamma_{ij}(p_i \otimes p_i), \quad (4)$$

with $\oplus$ notating the outer product of vectors. For a 3D point cloud with N points, the updated 3D GMM parameter $\Theta_j$ can be estimated from these moments as:

$$w_j = \frac{M^j_0}{N}, \ \mu_j = \frac{M^j_1}{M^j_0}, \ \Sigma_j = \frac{M^j_2}{M^j_0} - \mu_j \otimes \mu_j. \quad (5)$$

During the EM iterations, in order to enforce that the 3D GMMs are spatially local such that no component will dominate all the points leading to mode collapse (more specifically, the affinity matrix should be sparse with only the entries for the neighboring pairs of point and 3D cluster being non-zero), the topology of the pixel-to-cluster pairs can be kept the same as in the initialization step, and only the non-zero entries in $\Gamma$ from the initialization step are updated. Let the parametric clustering procedure that generates anisotropic 3D GMMs from a dense point cloud be denoted as $$\Theta, \Gamma = g(\mathcal{P}), \quad (6)$$

with $\mathcal{P}$ being from the back-projection operation in equation (1), and $\Theta$ being the collection of 3D GMM parameters for all the J clusters. Note that the foregoing procedure is differentiable and can be back-propagated during training of the fusion model 150.

In parallel, the depth estimation application 146 computes an optical flow 414 between the frames 402 and 404 using an optical flow model 440. The optical flow 414 includes, for each pixel, a vector indicating how that pixel changed from the frame 402 to the frame 404. Any technically feasible optical flow model 440 can be used in some embodiments, including known machine learning models such as dense optical flow neural networks. Given the optical flow 414, the frame 402, and the depth map 404, the pose optimization module 304 performs a pose optimization technique to compute a relative camera pose between the frames 402 and 404. More formally, in some embodiments, to estimate the relative camera pose, the pose can be optimized by solving an optimization problem that minimizes reprojection error for dense correspondences between frames. More specifically, for the i-th pixel in frame t−1, the corresponding 3D point $$p^{t-1}_i$$

in frame t−1 and the ray directional vector $$d^t_i$$

passing through its corresponding pixel in frame t can be obtained, given the dense depth map $\mathcal{D}^{t-1}$, camera intrinsics, and dense pixel correspondence from optical flow. Then, the point-to-ray distance can be minimized after applying the rigid transformation T=[R|t] induced by camera rotation R and translation t:

$$\min_{T=[R|t]} \sum_i \left\| v(d^t_i, \hat{p}^{t-1}_i; T) \right\| \text{ with } v(d^t_i, \hat{p}^{t-1}_i; T) = [d^t_i]_x T \hat{p}^{t-1}_i, \quad (7)$$

where $$v(d^t_i, \hat{p}^{t-1}_i; T) \overset{def}{=} v_i$$

is the point-to-ray displacement vector for the i-th pixel after transformation;

$$[d_i^t]_\times$$

is the skew symmetrical matrix for the ray vecto $$d_i^t; \hat{p}_i^{t-1}$$

is the homogeneous coordinate of the 3D point $$p_i^{t-1}.$$

The superscript for T is ignored for notation simplicity.

The rigid transformation T can be represented using the 6D vector to $t_{6\,d}=[t, \theta]$, where $\theta$ is the 3D Euler angles for the rotation. The gradient of the point-to-ray distance $\Sigma_i \|v_i\|$ w.r.t. $t_{6\,d}$ can be written as:

$$\frac{\delta \sum_i \|v_i\|}{\delta t_{6d}} \sim \sum_i \hat{v}_i^T [d_i^t]_\times \left[ [Rp_i^{t-1} + t]_\times, I \right], \quad (8)$$

with $\hat{v}_i$ being the normalized vector of $v_i$. The last term in equation (8) is based on the assumption that each update on $t_{6d}$ is small such that $$T\hat{p}_i^{t-1}$$

can be linearized around the current state of $t_{6\,d}$. As the gradient with respect to the pose can be obtained analytically, the gradient descent steps of the optimization can be implemented as unrolled layers Then, the depth estimation application 146 transforms 410 the 3D GMM 408 generated by the depth map clustering module 302 using the relative camera pose generated by the pose estimation module 306 to generate a transformed 3D GMM 412. The transformation can include changing a position and/or orientation of the 3D GMM 408 based on the relative camera pose.

Given the transformed 3D GMM 412, the ray casting module 306 performs a ray casting technique using the transformed 3D GMM 412 to generate (1) a first depth map 422 that includes a depth estimate for each pixel of the frame 416, and (2) an uncertainty map 424 that indicates, for each pixel of the first depth map 422, an uncertainty associated with the depth at the pixel. Uncertainty can arise from, for example, rays that intersect tilted surfaces (i.e., blobs) of the 3D GMM 412 during the ray casting. More formally, given a camera pose, the goal is to predict a depth map from the 3D GMM representation $\Theta$. Such a prediction can be accomplished by considering each pixel in depth map as the expected point of occlusion of a 3D ray defined by the camera intrinsics and extrinsics and passing through the 3D GMM representation. Areas of high probability density with respect to the 3D GMM representation are more likely to form the point of occlusion and areas of low probability density are more likely to let the ray pass through unoccluded. An analytical ray-GMM interaction can, therefore, be formed as follows: casting any ray r corresponds to a 1D slice operation through a set of 3D GMMs. Such a slice can be written in closed form: given the camera center o and ray direction $d_i$, casting the i-th ray $r_i$ (t)=0+$td_i$ across the j-th component defined by $\Theta_j$ results in a 1 dimensional weighted Gaussian function with weight, first and second moments calculated as:

$$w_{ij} = w_j S\left(r_i(\mu_{ij}); \mu_j, \sum\nolimits_j\right) \quad (9)$$
$$\mu_{ij} = \sigma_{ij}^2 d_i^T \sum\nolimits_j^{-1} \mu_j, \sigma_{ij}^2 = \left(d_i^T \sum\nolimits_j^{-1} d_i\right)^{-1},$$

with S the similarity function also used in equation (3). The resampled depth $\hat{d}_i$ and the corresponding uncertainty $\hat{u}_i$ for the i-th pixel in the image can be computed as a weighted linear combination over 3D Gaussian components:

$$\hat{d}_i = \frac{\sum_j w_{ij} \Gamma_{ij} \mu_{ij}}{\sum_j w_{ij} \Gamma_{ij}}, \hat{u}_i = \frac{\sum_j w_{ij} \Gamma_{ij} \sigma_{ij}}{\sum_j w_{ij} \Gamma_{ij}}. \quad (10)$$

Since the camera center o and the ray direction $d_i$ depend on the camera pose and intrinsics, the resampled depth values from raycasting are a function of the camera pose and intrinsics as well. In summary, given the 3D GMMs $\Theta$, the affinity matrix $\Gamma$, the camera pose T and intrinsics K, the resampled depth map $\hat{\mathcal{D}}=\{\hat{d}_i\}$ and the corresponding uncertainty map $\hat{\mathcal{U}}=\{\hat{u}_i\}$ can be generated as:

$$\hat{\mathcal{D}}, \hat{\mathcal{U}} = \pi_d(T \circ \Theta, \Gamma; K), \quad (11)$$

where $T \circ \Theta$ is the 3D GMM composed with the rigid transformation T from the estimated camera pose, and which can be computed in closed form by simply transforming the mean and covariance parameters.

Given the relative camera pose $T^{t,t-1}$ and dense point cloud $\mathcal{P}^{t-1}$ from a previous frame, the 3D GMMs from $\mathcal{P}^{t-1}$ can be generated as described above. Then, the 3D GMMs can be aligned towards the current frame t, and the ray casting module 306 can perform analytical ray casting to resample the dense depth and uncertainty maps from the current view:

$$\hat{\mathcal{D}}^t, \hat{\mathcal{U}}^t = \pi_d\left(T^{t,t-1} \circ \Theta^{t-1}, \Gamma^{t-1}; K\right). \quad (12)$$

The alignment and resampling steps are for geometrical consistency among frames and relate the previous estimated state to the current state, which will be updated given the incoming RGB frame using the fusion model 150.

After the first depth map 422 and the uncertainty map 424 are generated, the depth estimation application 146 uses the fusion model 150 to fuse different information, including the first depth map 422, the uncertainty map, the frame 416, and a second depth map 418 that is generated estimating depth in the frame 416 using a single-frame depth estimation technique (shown as depth estimation model 450), in order to generate a fused depth map 426. Each pixel of the fused depth map 426 includes an estimated depth of a corresponding pixel of the video frame 416. Illustratively, the depth estimation application 146 inputs a concatenation 420 of the first depth map 422, the second depth map 424, the frame 416, and the uncertainty map 424 into the fusion model 150. Given such inputs, the fusion model 150 outputs the fused depth map 426. Further, experience has shown that the depth estimation process is robust to changes in the optical flow model 440 that is used to generate the optical flow 414 and the depth estimation model 450 that is used to generate the depth map 418.

In some embodiments, the fusion model 150 includes a stack hourglass neural network as its backbone and takes the concatenation of the RGB image at frame t, the single-image depth estimation, the resampled depth and uncertainty as the input. In such cases, the fusion model 150 learns to gate the less reliable depth estimations based on resampling uncertainty, geometric consistency, and image appearance. The gain $G^t$ can be regressed for rather than the fused depth map $\mathcal{D}^t$ directly:

$$\mathcal{D}^t = \hat{\mathcal{D}}^t + G^t\left(\hat{\mathcal{D}}^t - \hat{\mathcal{D}}^t\right), \tag{13}$$

with $$G^t = f(I^t, \mathcal{D}^t; \hat{\mathcal{D}}^t, \hat{\mathcal{U}}^t),$$

where f is the fusion model 150; $I^t$ and $\hat{\mathcal{D}}^t$ are the incoming RGB frame and its depth estimation from a single-view depth estimator.

In some embodiments, the fusion model 150 be trained using a loss function that includes three terms: optical flow, depth consistency, and depth smoothness losses. The optical flow loss term is a difference between optical flow computed from consecutive frames of a video and an optical flow computed from geometry. The optical flow computed from geometry can be computed as follows. Given a fused depth map output by the fusion model 150 for a current frame during training and the relative camera pose between a previous frame and the current frame, a point cloud corresponding to the fused depth map can be warped towards the previous frame, and the warped point cloud can be projected onto the image plane to generate another image that can be compared with the current frame to compute an optical flow, which is referred to herein as the optical flow computed from geometry. Notably, because the optical flows are directly computed from the consecutive frames and from the geometry, the supervised learning process does not require ground truth fused depth maps as training data. The depth consistency and depth smoothness terms are regularization terms used to help ensure that depth estimates are consistent between consecutive frames and the depth estimates are smooth across each frame, respectively.

More formally, the optical flow loss models the discrepancy between the reference optical flow $\mathcal{W}^{t-1,t}$ from the current frame to the previous frame, and the optical flow $\hat{\mathcal{W}}^{t-1,t}$ induced by the estimated depth $\mathcal{D}^t$ and relative camera pose $T^{-1}$ from frame t to frame t−1. For the i-th pixel in frame t with image coordinate $$x_i^t$$

and the corresponding 3D point at $$p_i^t,$$

the optical flow for it from frame t to t−1 is $$\hat{\mathcal{W}}^{t-1,t}(x_i^t) = \hat{x}_i^{t-1} - x_i^t. \tag{14}$$

In equation (14), $$\hat{x}_i^{t-1}$$

is the corresponding reprojected location in the previous frame, given the depth and camera pose.

Given the induced optical flow, the optical flow loss can be defined as its L1-norm difference from the reference flow:

$$\mathcal{L}_{flow} = \sum_i \left| \mathcal{W}^{t-1,t}(x_i^t) - \hat{\mathcal{W}}^{t-1,t}(x_i^t) \right|. \tag{15}$$

Temporal consistency can be enhanced by adding a depth consistency loss between consecutive frames. The consistency is defined to be the difference between the z-component of the aligned point clouds:

$$\mathcal{L}_{geom} = \sum_i \left| \left(T^{-1} \circ p_i^t\right)_z - \mathcal{D}^{t-1}\left(x_i^t + \mathcal{W}^{t-1,t}(x_i^t)\right) \right|. \tag{16}$$

The dense depth map can be regularized to be smooth except for the regions with a strong appearance gradient:

$$\mathcal{L}_{smooth} = \sum_i |\nabla_x \mathcal{D}^t(x_i)| \exp(-|\nabla_x I^t(x_i)|). \tag{17}$$

The overall loss function for an unsupervised learning technique used to train the fusion model 150 can be the sum of the above loss terms for optical flow, depth consistency, and smoothness:

$$\mathcal{L} = \mathcal{L}_{flow} + \lambda_g \mathcal{L}_{geom} + \lambda_s \mathcal{L}_{smooth}, \tag{18}$$

with $\lambda_g$=0.1 and $\lambda_s$=1.

Figure 5A:
FIG. 5A illustrates an exemplar frame of a video, according to various embodiments.

FIG. 5A illustrates an exemplar frame 502 of a video, according to various embodiments. As shown, the frame 502 is an RGB (red, green, blue) frame of a video, and the frame 502 depicts a kitchen.

Figure 5B:
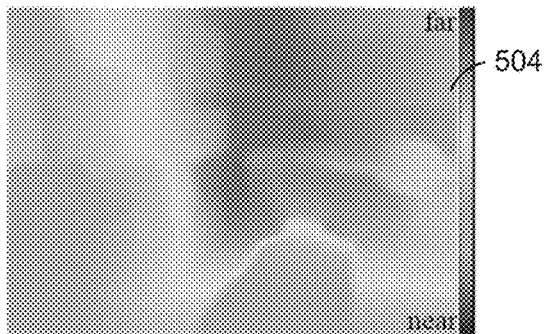
FIG. 5B illustrates an exemplar depth map generated using the fusion model of FIG. 1, according to various embodiments.

FIG. 5B illustrates an exemplar depth map 504 generated using the fusion model 150, according to various embodiments. The depth map 504 was generated for the frame 502 of FIG. 5A using the techniques described above in conjunction with FIGS. 3-4. More specifically, the depth map 504 is an output of the fusion model 150, similar to the depth map 426 of FIG. 4.

Figure 5C:
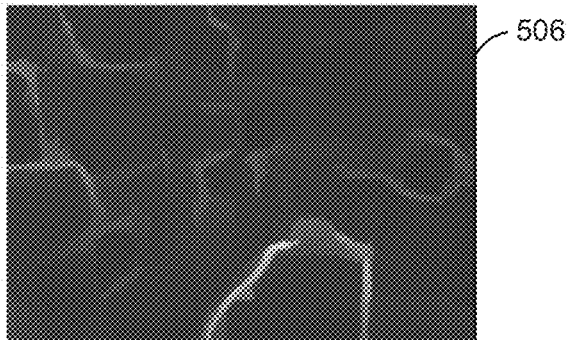
FIG. 5C illustrates an exemplar uncertainty map generated using the fusion model of FIG. 1, according to various embodiments.

FIG. 5C illustrates an exemplar uncertainty map 506 generated using the fusion model 150, according to various embodiments. The uncertainty map 506 was generated along with the depth map 504 of FIG. 5B using the ray casting techniques described above in conjunction with FIGS. 3-4. In some embodiments, the uncertainty map 506 is generated by the ray casting module 306 to indicate the uncertainty of the depth estimation for each pixel of the depth map 504, similar to the uncertainty map 424 of FIG. 4.

Figure 5D:
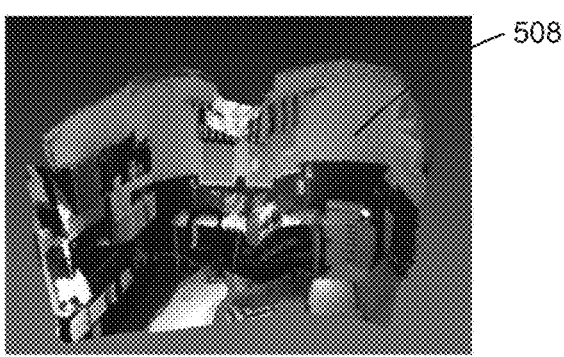
FIG. 5D illustrates an exemplar colored point cloud, according to various embodiments.

FIG. 5D illustrates an exemplar colored point cloud 508, according to various embodiments. The colored point cloud 508 was generated by accumulating point clouds associated with 100 frames of a video, the frame 502 of FIG. 5A being one of those frames, using corresponding camera poses and depth maps that were estimated using the techniques described above in conjunction with FIGS. 3-4.

Figure 6:
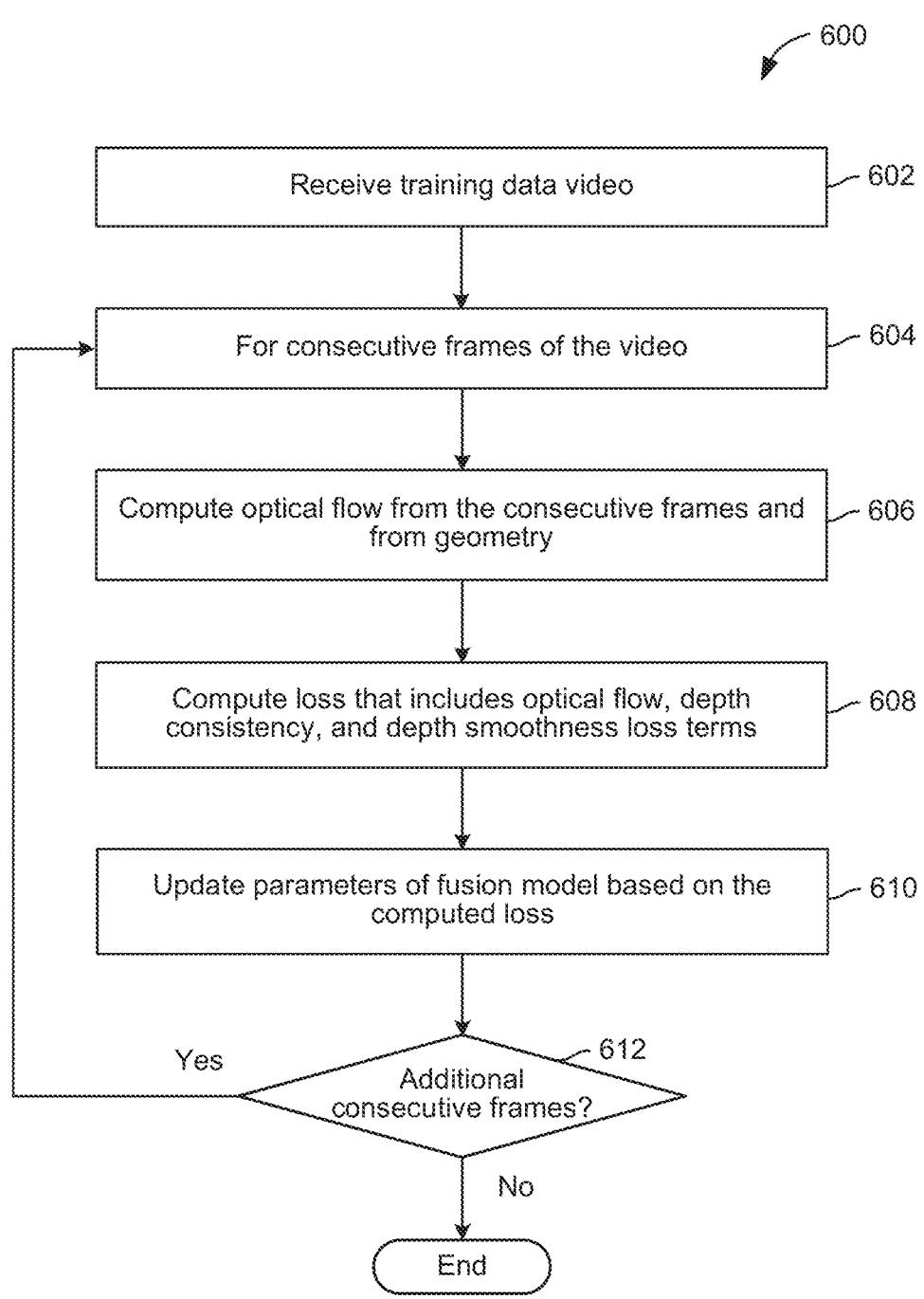
FIG. 6 is a flow diagram of method steps for training the fusion model of FIG. 1, according to various embodiments.

FIG. 6 is a flow diagram of method steps for training the fusion model 150, according to various embodiments. Although the method steps are described in conjunction with the systems of FIGS. 1-3, persons skilled in the art will understand that any system configured to perform the method steps in any order falls within the scope of the present embodiments.

As shown, a method 600 begins at step 602, where the model trainer 116 receives a training data video, which includes multiple frames. Although the method 600 is described with respect to one training data video for succinctness, in some embodiments, the fusion model 150 can be trained using any number of training data videos.

At step 604, the model trainer 116 enters a loop in which the model trainer 116 performs steps 706 to 718 for consecutive frames of the video.

At step 606, the model trainer 116 computes an optical flow from the consecutive frames and from geometry. As described, one optical flow can be computed from consecutive frames by, for example, inputting the consecutive frames into a dense optical flow neural network that outputs the optical flow. Another optical flow can be computed from geometry as follows. Given a fused depth map output by the fusion model 150 for a current frame during training and a relative camera pose between a previous frame and the current frame, a point cloud corresponding to the fused depth map can be warped towards the previous frame, and the warped point cloud can be projected onto the image plane to generate another image that can be compared with the current frame to compute the optical flow. Notably, because the optical flows are directly computed from consecutive frames and from geometry, ground truth fused depth maps are not required as training data.

At step 608, the model trainer 116 computes a loss that includes optical flow, depth consistency, and depth smoothness loss terms. In some embodiments, the loss can be computed as described above in conjunction with FIG. 4. In such cases, the optical flow loss term in particular can be computed as a difference between the optical from computed from consecutive frames and the optical flow computed from geometry at step 606.

At step 610, the model trainer 116 updates parameters of the fusion model 150 based on the computed loss. In some embodiments, the model trainer 116 can perform backpropagation with gradient descent, or a variation thereof, to update the parameters of the fusion model.

At step 612, if there are additional consecutive frames, then the method returns to step 604, where the model trainer 116 uses the next pair of consecutive frames in the video to train the fusion model 150. On the other hand, if there are no additional consecutive frames, then the method 600 ends.

Figure 7:
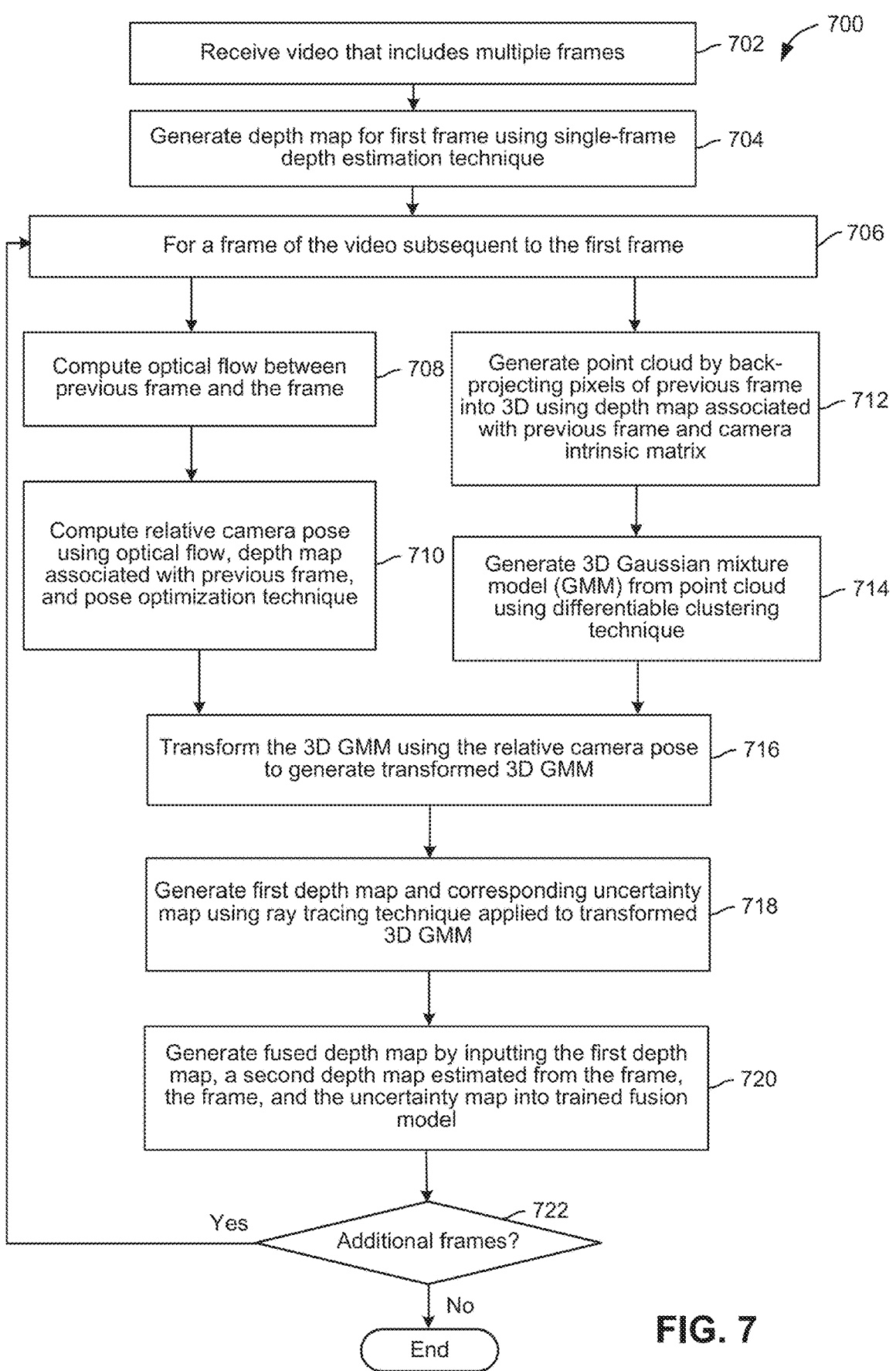
FIG. 7 is a flow diagram of method steps for generating depth maps associated with the different frames of a video, according to various embodiments.

FIG. 7 is a flow diagram of method steps for generating depth maps associated with the different frames of a video, according to various embodiments. Although the method steps are described in conjunction with the systems of FIGS. 1-3, persons skilled in the art will understand that any system configured to perform the method steps in any order falls within the scope of the present embodiments.

As shown, a method 700 begins at step 702, where the depth estimation application 146 receives a video that includes multiple frames. For example, the video could be a video that is captured in real time. As another example, the video could be a stored video.

At step 704, the depth estimation application 146 generates a depth map for a first frame of the video using a single-frame depth estimation technique. In some embodiments, any technically feasible single-frame depth estimation technique, such as processing the first frame using a depth estimation neural network or estimating depth using depth data that is acquired via one or more depth sensors, can be used to generate the depth map.

At step 706, the depth estimation application 146 enters a loop in which the depth estimation application 146 performs steps 706 to 718 for each frame of the video subsequent to the first frame.

At step 708, the depth estimation application 146 computes an optical flow between previous frame and the frame. In some embodiments, any technically feasible technique, including known techniques such as processing the frame using a dense optical flow neural network, can be employed to compute the optical flow.

At step 710, the depth estimation application 146 computes a relative camera pose using the optical flow, a depth map associated with previous frame, and a pose optimization technique. In some embodiments, the pose optimization technique is the differentiable optimization technique described above in conjunction with FIG. 4. In such cases, the differentiable optimization technique can be applied to compute the relative camera pose given the optical flow, the previous frame, and the depth map associated with the previous frame.

In parallel with steps 708 and 710, at step 712, the depth estimation application 146 generates a point cloud by backprojecting pixels of the previous frame into 3D using the depth map associated with previous frame and a camera intrinsic matrix.

At step 714, the depth estimation application 146 generates a 3D GMM from the point cloud using a differentiable clustering technique. In some embodiments, the differentiable clustering technique can be the EM-like technique described above in conjunction with FIG. 4.

At step 716, the depth estimation application 146 transforms the 3D GMM generated at step 714 using the relative camera pose computed at step 710 to generate a transformed 3D GMM.

At step 718, the depth estimation application 146 generates a first depth map and a corresponding uncertainty map using a ray tracing technique that is applied to the transformed 3D GMM. In some embodiments, the ray tracing technique is a ray casting technique that the depth estimation application 146 uses to render the 3D GMM to generate the first depth map, and the uncertainty map indicates uncertainties in depth estimates within the first depth map.

At step 720, the depth estimation application 146 generates a fused depth map by inputting the first depth map, a second depth map estimated from the frame using a single-frame depth estimation technique, the frame, and the uncertainty map into the trained fusion model 150. In some embodiments, the fusion model 150 is a machine learning model, such as a neural network including an hourglass architecture, that is trained to output the fused depth given the first depth map, the second depth estimated from the frame, the frame, and the uncertainty map as inputs, as described above in conjunction with FIG. 4.

At step 722, if there are additional frames of the video to process, then the method 700 returns to step 706, where the depth estimation application 146 again performs steps 706 to 718 for the next frame of the video. On the other hand, if there are no additional frames of the video to process, then the method 700 ends.

In sum, techniques are disclosed for generating depth maps for the frames of a video. In some embodiments, a depth estimation application processes the first frame of a video using a single-frame depth estimation technique to generate a depth map for the first frame. For each subsequent frame of the video, the depth estimation application computes an optical flow between a previous frame and the current frame, and the depth estimation application then applies a pose optimization technique to compute a relative camera pose between the previous frame and the current frame given the optical flow and a depth map associated with the previous frame. In parallel, the depth estimation application generates a point cloud for the previous frame by back-projecting pixels of the previous frame into 3D using the depth map associated with the previous frame and a camera intrinsic matrix, and the depth estimation application then generates a 3D GMM from the point cloud using a differentiable clustering technique. Subsequently, the depth estimation application transforms the 3D GMM using the relative camera pose to generate a transformed 3D GMM. Then, the depth estimation application generates a first depth map and a corresponding uncertainty map by rendering the transformed 3D GMM using a ray tracing technique. Thereafter, the depth estimation application generates a fused depth map, which includes depth estimates for objects in the current frame, by inputting the first depth map, a second depth map estimated from the current frame using a single-frame depth estimation technique, the current frame, and the uncertainty map into a trained fusion model that outputs the fused depth map.

At least one technical advantage of the disclosed techniques relative to the prior art is that the disclosed techniques can be used to generate temporally-coherent depth maps for the different frames of a video sequence. Videos generated using the temporally-coherent depth maps advantageously include fewer flickering artifacts relative to videos that are rendered using depth maps that are generated by separately processing each frame of a video sequence. In addition, with the disclosed techniques, a machine learning model does not have to be trained using the video for which depth maps are to be generated. Accordingly, the disclosed techniques are more computationally efficient than conventional approaches that require the use of such a trained machine learning model. As a result, the disclosed technique can be used to generate depth maps for the frames of a video in real-time, as the video is being captured. These technical advantages represent one or more technological improvements over prior art approaches.

1. In some embodiments, a computer-implemented method for generating a first depth map for a first frame of a video comprises performing one or more operations to generate a first intermediate depth map based on the first frame and a second frame preceding the first frame within the video, performing one or more operations to generate a second intermediate depth map based on the first frame, and performing one or more operations to combine the first intermediate depth map and the second intermediate depth map to generate the first depth map.

2. The computer-implemented method of clause 1, wherein performing the one or more operations to generate the first intermediate depth map comprises performing one or more operations to generate a three-dimensional (3D) Gaussian mixture model (GMM) based on the second frame and a second depth map associated with the second frame, transforming the 3D GMM based on a relative pose between the first frame and the second frame to generate a transformed 3D GMM, and rendering the transformed 3D GMM to generate the first intermediate depth map.

3. The computer-implemented method of clauses 1 or 2, further comprising computing an optical flow based on the first frame and the second frame, and computing the relative pose between the first frame and the second frame based on the optical flow and the second depth map.

4. The computer-implemented method of any of clauses 1-3, wherein performing the one or more operations to generate the 3D GMM comprises performing one or more iterative optimization operations.

5. The computer-implemented method of any of clauses 1-4, wherein performing the one or more operations to generate the 3D GMM comprises performing one or more operations to generate a point cloud based on the second frame and the second depth map, and performing one or more clustering operations based on the point cloud to generate the 3D GMM.

6. The computer-implemented method of any of clauses 1-5, wherein performing the one or more operations to combine the first intermediate depth map and the second intermediate depth map comprises processing the first intermediate depth map, the second intermediate depth map, the first frame, and an uncertainty map associated with the first intermediate depth map using a machine learning model that generates the first depth map.

7. The computer-implemented method of any of clauses 1-6, wherein the machine learning model comprises an hourglass architecture.

8. The computer-implemented method of any of clauses 1-7, wherein the machine learning model is trained using a loss between one or more optical flows computed for consecutive frames of one or more videos and one or more optical flows computed using one or more depth maps generated using the machine learning model during training.

9. The computer-implemented method of any of clauses 1-8, wherein the machine learning model is trained using a loss based on consistency between a plurality of depth maps generated for one or more consecutive frames of one or more training videos.

10. The computer-implemented method of any of clauses 1-9, wherein the machine learning model is trained using a loss that penalizes a lack of smoothness within one or more depth maps generated by the machine learning model.

11. In some embodiments, one or more non-transitory computer-readable media store instructions that, when executed by at least one processor, cause the at least one processor to perform the steps of performing one or more operations to generate a first intermediate depth map based on a first frame of a video and a second frame preceding the first frame within the video, performing one or more operations to generate a second intermediate depth map based on the first frame, and performing one or more operations to combine the first intermediate depth map and the second intermediate depth map to generate the first depth map.

12. The one or more non-transitory computer-readable media of clause 11, wherein performing the one or more operations to generate the first intermediate depth map comprises performing one or more operations to generate a three-dimensional (3D) Gaussian mixture model (GMM) based on the second frame and a second depth map associated with the second frame, transforming the 3D GMM based on a relative pose between the first frame and the second frame to generate a transformed 3D GMM, and rendering the transformed 3D GMM to generate the first intermediate depth map.

13. The one or more non-transitory computer-readable media of clauses 11 or 12, wherein the instructions, when executed by the at least one processor, further cause the at least one processor to perform the steps of computing an optical flow based on the first frame and the second frame, and computing the relative pose between the first frame and the second frame based on the optical flow and the second depth map.

14. The one or more non-transitory computer-readable media of any of clauses 11-13, wherein performing the one or more operations to generate the 3D GMM comprises performing one or more iterative optimization operations.

15. The one or more non-transitory computer-readable media of any of clauses 11-14, wherein performing the one or more operations to generate the 3D GMM comprises performing one or more operations to generate a point cloud based on the second frame and the second depth map, and performing one or more clustering operations based on the point cloud to generate the 3D GMM.

16. The one or more non-transitory computer-readable media of any of clauses 11-15, wherein performing the one or more operations to combine the first intermediate depth map and the second intermediate depth map comprises processing the first intermediate depth map, the second intermediate depth map, the first frame, and an uncertainty map associated with the first intermediate depth map using a machine learning model that generates the first depth map.

17. The one or more non-transitory computer-readable media of any of clauses 11-16, wherein the machine learning model comprises an hourglass architecture.

18. The one or more non-transitory computer-readable media of any of clauses 11-17, wherein the machine learning model is trained using a loss between one or more optical flows computed for consecutive frames of one or more videos and one or more optical flows computed using one or more depth maps generated using the machine learning model during training.

19. The one or more non-transitory computer-readable media of any of clauses 11-18, wherein the instructions, when executed by the at least one processor, further cause the at least one processor to perform the step of rendering one or more images using the first depth map.

20. In some embodiments, a system comprises one or more memories storing instructions, and one or more processors that are coupled to the one or more memories and, when executing the instructions, are configured to perform one or more operations to generate a first intermediate depth map based on a first frame of a video and a second frame preceding the first frame within the video, perform one or more operations to generate a second intermediate depth map based on the first frame, and perform one or more operations to combine the first intermediate depth map and the second intermediate depth map to generate the first depth map.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a first depth map for a first frame of a video, the method comprising:
    performing one or more operations to generate a second depth map from a second frame preceding the first frame within the video;
    performing one or more operations to generate a first intermediate depth map based on the first frame and the second depth map;
    performing one or more operations to generate a second intermediate depth map based on the first frame; and
    performing one or more operations to combine the first intermediate depth map and the second intermediate depth map to generate the first depth map.

2. The computer-implemented method of claim 1, wherein performing the one or more operations to generate the first intermediate depth map comprises:
    performing one or more operations to generate a three-dimensional (3D) Gaussian mixture model (GMM) based on the second frame and the second depth map;
    transforming the 3D GMM based on a relative pose between the first frame and the second frame to generate a transformed 3D GMM; and
    rendering the transformed 3D GMM to generate the first intermediate depth map.

3. The computer-implemented method of claim 2, further comprising:
    computing an optical flow based on the first frame and the second frame; and
    computing the relative pose between the first frame and the second frame based on the optical flow and the second depth map.

4. The computer-implemented method of claim 2, wherein performing the one or more operations to generate the 3D GMM comprises performing one or more iterative optimization operations.

5. The computer-implemented method of claim 2, wherein performing the one or more operations to generate the 3D GMM comprises:
    performing one or more operations to generate a point cloud based on the second frame and the second depth map; and
    performing one or more clustering operations based on the point cloud to generate the 3D GMM.

6. The computer-implemented method of claim 1, wherein performing the one or more operations to combine the first intermediate depth map and the second intermediate depth map comprises processing the first intermediate depth map, the second intermediate depth map, the first frame, and an uncertainty map associated with the first intermediate depth map using a machine learning model that generates the first depth map.

7. The computer-implemented method of claim 6, wherein the machine learning model comprises an hourglass architecture.

8. The computer-implemented method of claim 6, wherein the machine learning model is trained using a loss between one or more optical flows computed for consecutive frames of one or more videos and one or more optical flows computed using one or more depth maps generated using the machine learning model during training.

9. The computer-implemented method of claim 6, wherein the machine learning model is trained using a loss based on consistency between a plurality of depth maps generated for one or more consecutive frames of one or more training videos.

10. The computer-implemented method of claim 6, wherein the machine learning model is trained using a loss that penalizes a lack of smoothness within one or more depth maps generated by the machine learning model.

11. One or more non-transitory computer-readable media storing instructions that, when executed by at least one processor, cause the at least one processor to perform the steps of:
    performing one or more operations to generate a second depth map from a second frame of a video preceding a first frame within the video;
    performing one or more operations to generate a first intermediate depth map based on the first frame and the second depth map;
    performing one or more operations to generate a second intermediate depth map based on the first frame; and
    performing one or more operations to combine the first intermediate depth map and the second intermediate depth map to generate a first depth map.

12. The one or more non-transitory computer-readable media of claim 11, wherein performing the one or more operations to generate the first intermediate depth map comprises:
    performing one or more operations to generate a three-dimensional (3D) Gaussian mixture model (GMM) based on the second frame and the second depth map;
    transforming the 3D GMM based on a relative pose between the first frame and the second frame to generate a transformed 3D GMM; and
    rendering the transformed 3D GMM to generate the first intermediate depth map.

13. The one or more non-transitory computer-readable media of claim 12, wherein the instructions, when executed by the at least one processor, further cause the at least one processor to perform the steps of:
    computing an optical flow based on the first frame and the second frame; and computing the relative pose between the first frame and the second frame based on the optical flow and the second depth map.

14. The one or more non-transitory computer-readable media of claim 12, wherein performing the one or more operations to generate the 3D GMM comprises performing one or more iterative optimization operations.

15. The one or more non-transitory computer-readable media of claim 12, wherein performing the one or more operations to generate the 3D GMM comprises:

performing one or more operations to generate a point cloud based on the second frame and the second depth map; and performing one or more clustering operations based on the point cloud to generate the 3D GMM.

16. The one or more non-transitory computer-readable media of claim 11, wherein performing the one or more operations to combine the first intermediate depth map and the second intermediate depth map comprises processing the first intermediate depth map, the second intermediate depth map, the first frame, and an uncertainty map associated with the first intermediate depth map using a machine learning model that generates the first depth map.

17. The one or more non-transitory computer-readable media of claim 16, wherein the machine learning model comprises an hourglass architecture.

18. The one or more non-transitory computer-readable media of claim 16, wherein the machine learning model is trained using a loss between one or more optical flows computed for consecutive frames of one or more videos and one or more optical flows computed using one or more depth maps generated using the machine learning model during training.

19. The one or more non-transitory computer-readable media of claim 11, wherein the instructions, when executed by the at least one processor, further cause the at least one processor to perform the step of rendering one or more images using the first depth map.

20. A system, comprising:

one or more memories storing instructions; and one or more processors that are coupled to the one or more memories and, when executing the instructions, are configured to:

perform one or more operations to generate a depth map from a second frame of a video preceding a first frame within the video, performing one or more operations to generate a first intermediate depth map based on the first frame and the depth map, perform one or more operations to generate a second intermediate depth map based on the first frame, and perform one or more operations to combine the first intermediate depth map and the second intermediate depth map to generate a first depth map.

*   *   *   *   *